(12) United States Patent
Kojima

(10) Patent No.: US 6,568,698 B2
(45) Date of Patent: May 27, 2003

(54) RACK-PINION TYPE STEERING APPARATUS

(75) Inventor: Takahiro Kojima, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 3 days.

(21) Appl. No.: 09/906,709

(22) Filed: Jul. 18, 2001

(65) Prior Publication Data

US 2002/0020981 A1 Feb. 21, 2002

(30) Foreign Application Priority Data

Jul. 28, 2000 (JP) ........................................ 2000-228018

(51) Int. Cl.[7] ................................................ B62D 3/12
(52) U.S. Cl. .................................. 280/93.514; 180/427
(58) Field of Search .................... 280/93.514, 93.515; 180/417, 426, 427; 74/422, 109, 498, 89.11; 24/545, 563, 3.12

(56) References Cited

U.S. PATENT DOCUMENTS 4,721,175 A * 1/1988 Butler ......................... 180/428
5,511,630 A * 4/1996 Kohata et al. ............... 180/421
5,562,016 A * 10/1996 Schoffel ...................... 91/375 A
5,694,810 A * 12/1997 Iwasa et al. ................... 74/422

FOREIGN PATENT DOCUMENTS

| JP | 62-17420 | * | 1/1987 |
| JP | 2600560 | | 8/1999 |
| JP | 11-208491 | * | 8/1999 |

* cited by examiner

Primary Examiner—Paul N Dickson
Assistant Examiner—David R. Dunn
(74) Attorney, Agent, or Firm—Smith, Gambrell & Russell, LLP

(57) ABSTRACT

An end cap arranged to slidably support a rack, is inserted into an end of a housing in which the rack is inserted. A cir-clip is interposed between the housing and the end cap to prevent the end cap from being moved axially of the rack. The cir-clip is provided at one end thereof with (i) an inwardly bent curved portion and (ii) a linear portion linearly extending inwardly from the tip of the curved portion and having a tip which always comes in contact with the bottom of an annular groove of the end cap.

1 Claim, 9 Drawing Sheets

PRIOR ART

RACK-PINION TYPE STEERING APPARATUS

BACKGROUND OF THE INVENTION

The present invention relates to a rack-pinion type steering apparatus to be used for the wheels of motor vehicles or the like.

FIG. 7 is a front view, with portions broken away, of a rack-pinion type power steering apparatus of prior art, in which an auxiliary steering force is obtained by oil pressure. This steering apparatus comprises a steering shaft 92 connected to a steering wheel (not shown), a pinion 93 connected to the steering shaft 92, a rack 94 meshed with this pinion 93, a cylindrical metallic housing 95 in which the rack 94 is inserted, and a valve device 98 for supplying oil pressure, according to the steering force and the steering direction, to oil chambers 95a, 95b inside of the housing 95. Through ball joints 96, tie rods 97 are connected to the both ends of the rack 94 which project from the both ends of the housing 95. Wheels are connected to the tie rods 97 through knuckle arms (not shown) or the like. With the arrangement above-mentioned, when the pinion 93 is rotated by a steering operation, the rack 94 is axially moved to change the steering angle.

A ring-like end cap 101 is mounted at one end of the housing 95, and the rack 94 is slidably inserted in this end cap 101. This end cap 101 is inserted in the inner peripheral surface of the end portion of the housing 95. A cir-clip 102 wound on the outer periphery of the end cap 101, restrains the end cap 101 from being moved axially of the housing 95 (See FIG. 8). More specifically, annular grooves 103, 104 are oppositely formed respectively in the inner periphery of one end of the housing 95 and the outer periphery of the end cap 101, each annular groove 103, 104 having a depth substantially equal to a half of the diameter of the cir-clip 102 (See FIG. 9). The cir-clip 102 is inserted into the annular space defined by the annular grooves 103, 104, thus causing the end cap 101 to be engaged with the housing 95.

The cir-clip 102 is made of a metallic wire and has, as shown in FIG. 10 illustrating its free state before mounted, a linear winding portion 102a to be wound along the annular grooves 103, 104, and a hook portion 102b bent at one end of the winding portion 102a at a right angle thereto. The hook portion 102b is passed through an insertion opening 105 formed in the peripheral surface of the housing 95 and is hooked at an engagement groove 101b of the end cap 101 (See FIG. 11). At this state, the end cap 101 is rotated with a tool such that while being wound in the annular groove 104 of the end cap 101, the winding portion 102a of the cir-clip 102 is successively introduced inside of the housing 95 and is mounted in the space defined by the annular grooves 103, 104. At this time, the end cap 101 is rotated substantially by one and a half revolutions such that the hook portion 102b of the cir-clip 102 is located substantially at the opposite side of the insertion opening 105 with respect to the axis of the end cap 101 (See FIG. 8).

In the steering apparatus above-mentioned, the ball joint 96 strikes the end cap 101 to regulate the maximum steering angle position in one direction (rightward moving stroke of the rack 94 in FIG. 7). However, when the ball joint 96 strikes the end cap 101 with an excessive steering force applied to the rack 94, a relative twist occurs between the ball joint 96 and the rack 94. So, the end cap 101 may be slightly rotated together with the cir-clip 102. When the end cap 101 is repeatedly rotated, there are instances where the tip of the cir-clip 102 is moved up to the insertion opening 105 of the housing 95. This involves the likelihood that the tip of the cir-clip 102 springs out of the insertion opening 105 due to its spring back (See FIG. 12), that the subsequent portion is consecutively gradually springs out of the housing 95 (See FIG. 13), and that it becomes finally impossible to prevent the end cap 101 from being axially freely moved.

In this connection, provision is made as shown in FIGS. 14 and 15. That is, the other end of the cir-clip 102 is bent arcuately or linearly to form a bent portion 102e, and this bent portion 102e is resiliently mounted in the space defined by the annular groove 103 of the end cap 101 and the annular groove 104 of the housing 95, thus restraining the cir-clip 102 from being rotated.

However, the former arcuately bent portion 102e easily follows the annular grooves 103, 104. Accordingly, the bent portion 102e cannot strongly resiliently be mounted in the space between the annular grooves 103, 104. This introduces the problem that the end cap 101 is not effectively prevented from being rotated. Further, when the bent portion 102e is moved to the insertion opening 105 of the housing 95 in association with the rotation of the end cap 101, there are instances where the bent portion 102e runs onto the opening edge of the insertion opening 105 of the end cap 101 and springs out of the insertion opening 105. Accordingly, the cir-clip 102 cannot securely be prevented from springing out of the housing 95. The latter linearly bent portion 102e can strongly resiliently be mounted in the space between the annular grooves 103, 104, thus effectively preventing the end cap 101 from being rotated. However, stress concentration occurs at a bending starting point X. Therefore, the bending starting point X is disadvantageously readily broken and therefore poor in durability.

OBJECT OF THE INVENTION

It is an object of the present invention to provide a rack-pinion type steering apparatus capable of securely preventing, for a long period of time, the cir-clip from springing out of the housing.

SUMMARY OF THE INVENTION

A rack-pinion type steering apparatus according to the present invention comprises: a pinion connected to a steering shaft; a rack meshed with the pinion; a cylindrical housing in which the rack is inserted; an end cap inserted into one end of the housing with the rack inserted in the housing; and a cir-clip interposed between an annular groove formed in the outer periphery of the end cap and an annular groove which is opposite to the first-mentioned annular groove and which is formed in the housing, the cir-clip being arranged to prevent the end cap from being moved axially of the housing, the cir-clip being provided at an end thereof with (i) an inwardly bent curved portion and (ii) a linear portion linearly extending inwardly from the tip of the curved portion and having a tip which always comes in contact with the bottom of the annular groove in the end cap.

According to the rack-pinion type steering apparatus having the arrangement above-mentioned, when the end cap is rotated to cause the curved portion and the linear portion to be moved to the insertion opening of the housing, the curved portion and the linear portion are restored substantially to the original shapes, and the curved portion and its vicinities project from the insertion opening. At this state, the tip of the linear portion is held as coming in contact with the bottom of the annular groove of the end cap.

Accordingly, the tip side of the linear portion or the curved portion can selectively be engaged with the opening edge of the insertion opening according to the rotational direction of the end cap. This securely prevents the end cap from being rotated. Further, the curved portion prevents stress concentration from occurring at one end of the cir-clip. Thus, there is no danger of the cir-clip from being broken. It is therefore possible to securely prevent, for a long period of time, the cir-clip from springing out from the insertion opening.

In the rack-pinion type steering apparatus of the present invention, the curvature radius of the curved portion of the cir-clip in a free state (before the cir-clip is mounted in the space between the annular grooves), is preferably smaller than the curvature radius of the annular groove of the end cap.

According to the arrangement above-mentioned, the elastic rebound force of the curved portion can be increased, enabling one end of the cir-clip to be strongly resiliently mounted in the space between the annular groove in the end cap and the annular groove in the housing. This effectively prevents the end cap from being rotated. It is therefore possible to restrain, for a long period of time, the curved portion and its vicinities of the cir-clip from being moved to the insertion opening. Accordingly, the end cap can stably be engaged with the housing for a long period of time.

DESCRIPTION OF THE PREFERRED EMBODIMENTS

The present invention will be discussed in detail with reference to attached drawings illustrating a preferred embodiment of the present invention.

Figure 1:
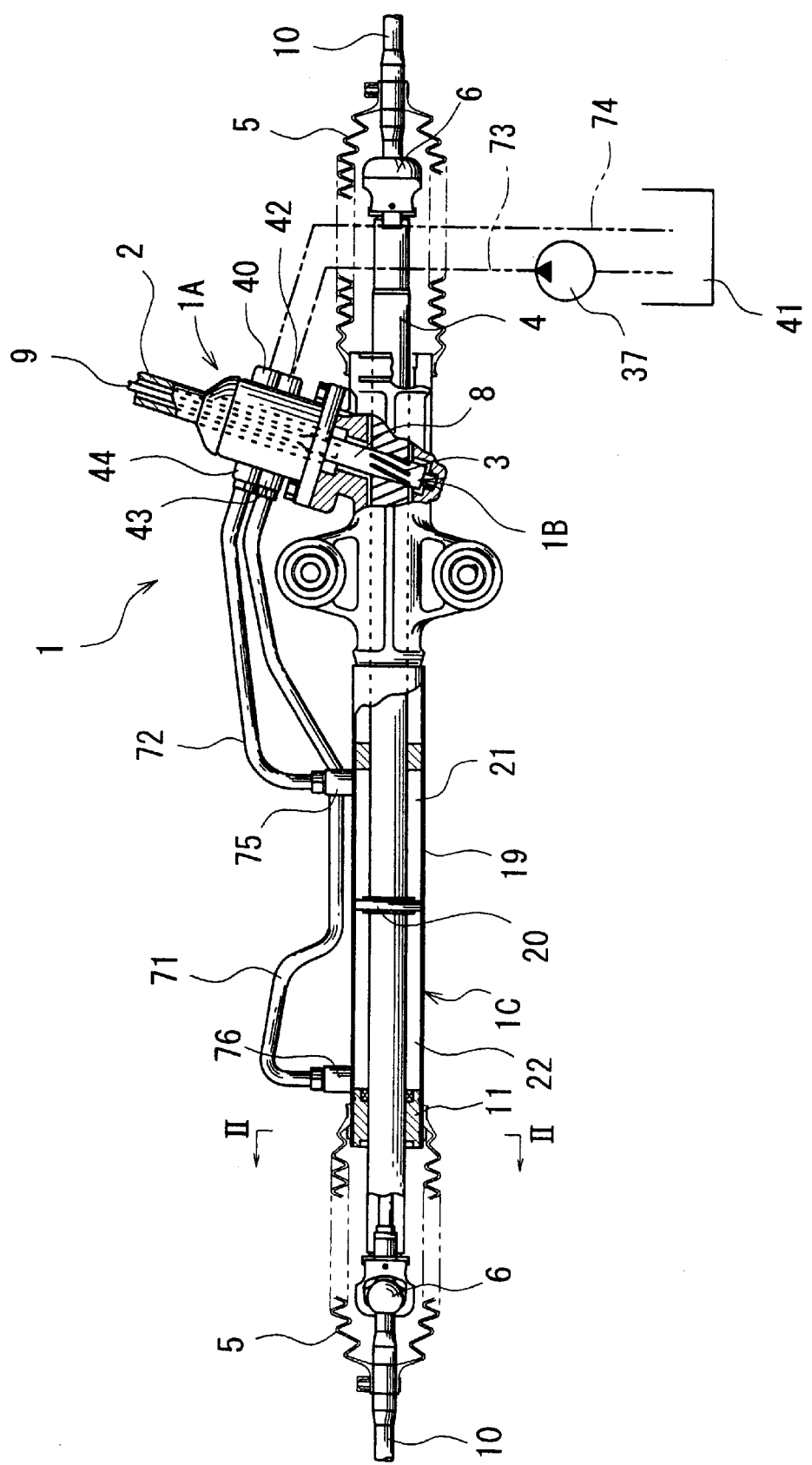
FIG. 1 is a front view, with portions broken away, of a rack-pinion type steering apparatus of the present invention.

With reference to FIG. 1, the following description will discuss the entire arrangement of a rack-pinion type steering apparatus of the present invention. A steering apparatus 1 is a rack-pinion type hydraulic power steering apparatus which comprises a valve device 1A, a rack-pinion device 1B, and a hydraulic cylinder device 1C connected to one another, and which is arranged such that an auxiliary steering force supplied by oil pressure is added, according to a steering operation, to the steering force given to a rack 4 from an output shaft 8.

A rotary valve is disposed in the valve device 1A. Inserted into the center part of the rotary valve are an input shaft 2 connected to a steering wheel (not shown), and a torsion bar 9 of which only upper portion is secured to the input shaft 2. The lower end of the torsion bar 9 is connected to the output shaft 8 such that a steering force (rotation torque) given to the input shaft 2 is transmitted to the output shaft 8 through the torsion bar 9. Accordingly, the input shaft 2 is rotatable with respect to the output shaft 8 by an amount corresponding to the twist of the torsion bar 9 according to steering resistance.

The valve device 1A is provided on the outer peripheral surface thereof with an inlet port 42, an outlet port 40, and first and second pipe connection ports 43, 44. The inlet port 42 is connected to a pump 37 through a pipe 73. An operating oil sucked from a tank 41 by the pump 37 is supplied to the valve device 1A at predetermined pressure. The outlet port 40 is connected to the tank 41 through a pipe 74 such that an operating oil discharged from the valve device 1A is returned to the tank 41.

The output shaft 8 is provided at a lower portion thereof with a pinion 3, which is meshed with the rack 4 of the rack-pinion device 1B.

Tie rods 10 are connected, through ball joints 6, to the transverse ends of the rack 4. Steering wheels are connected to the tie rods 10 through knuckle arms or the like such that the wheels are steered according to the transverse movement of the rack 4.

The hydraulic cylinder device 1C connected to the rack-pinion device 1B, forms a cylinder in which the transverse movement of the rack 4 serves as a piston motion, and is disposed as an actuator for giving an auxiliary steering force. The hydraulic cylinder device 1C is mainly formed by a cylinder tube 19 serving as a housing, and a piston 20 formed integrally with the rack 4. This piston 20 partitions the inside of the cylinder tube 19 to form a pair of oil chambers 21, 22. The cylinder tube 19 is provided on the outer peripheral surface thereof with pipe connection ports 75, 76 respectively corresponding to the oil chambers 21, 22. These pipe connection ports 75, 76 are connected, through pipes 72, 71, to the pipe connection ports 44, 43 of the valve device 1A. The cylinder tube 19 is covered, at both ends thereof, with bellows-type boots 5 to prevent dirt, dust or the like from entering inside of the cylinder tube 19.

Figure 9:
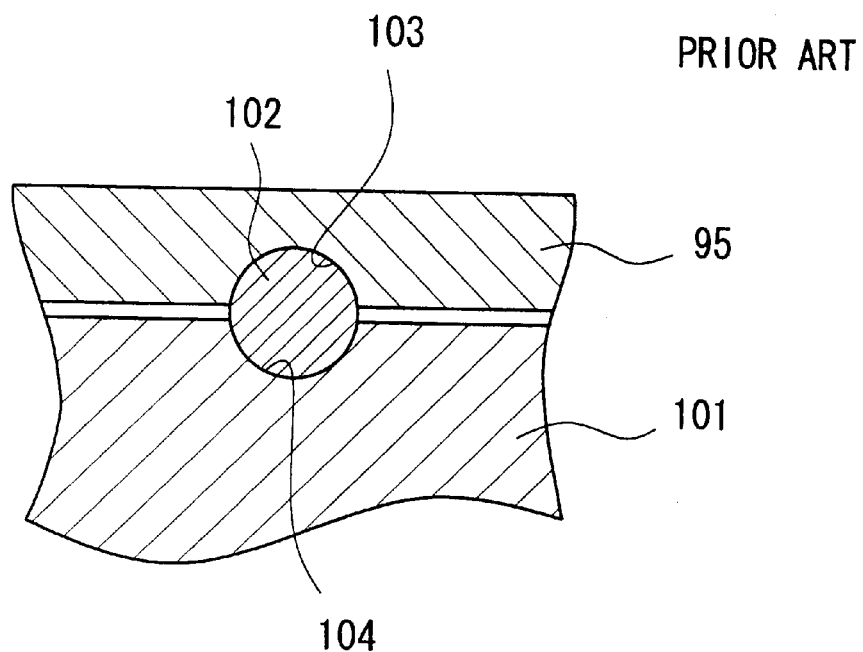
FIG. 9 is a section view of annular grooves in prior art.
Figure 10:
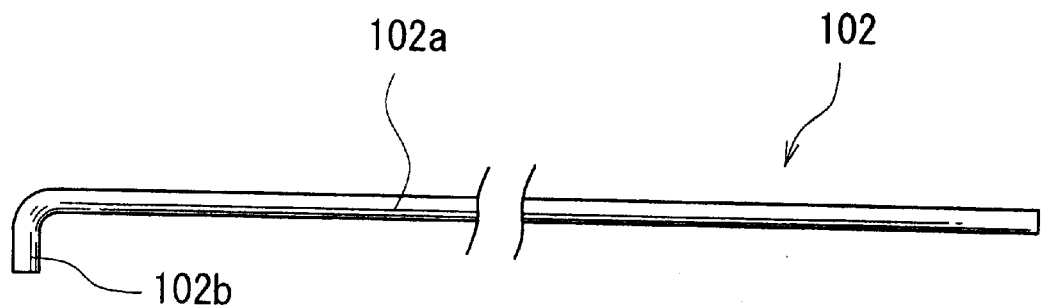
FIG. 10 is a front view of a cir-clip in a free state of prior art.
Figure 11:
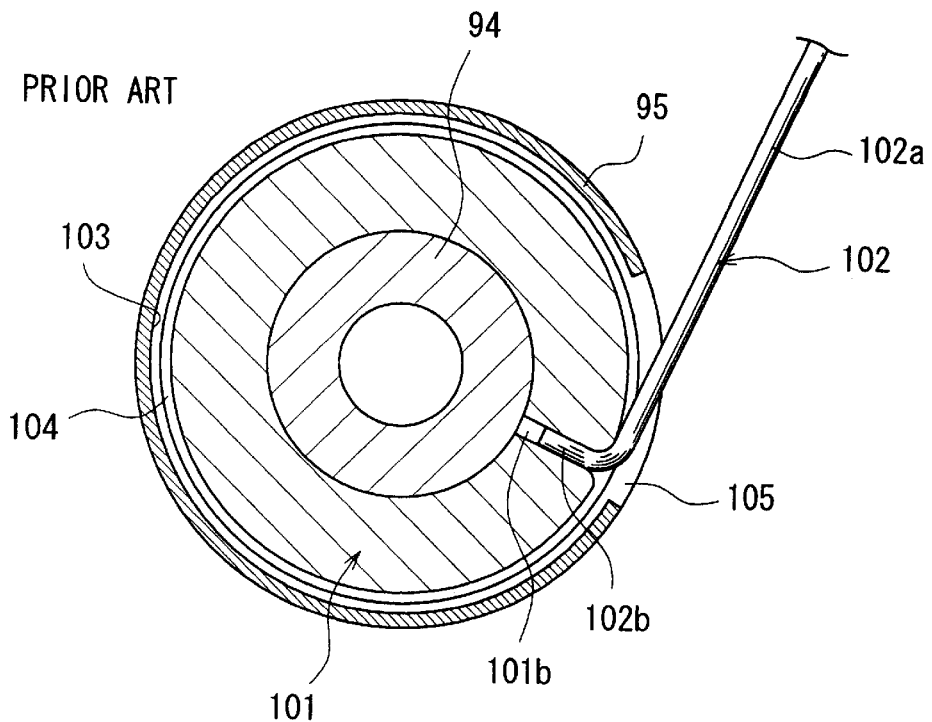
FIG. 11 is a section view of the cir-clip of prior art, illustrating how to mount the same.
Figure 12:
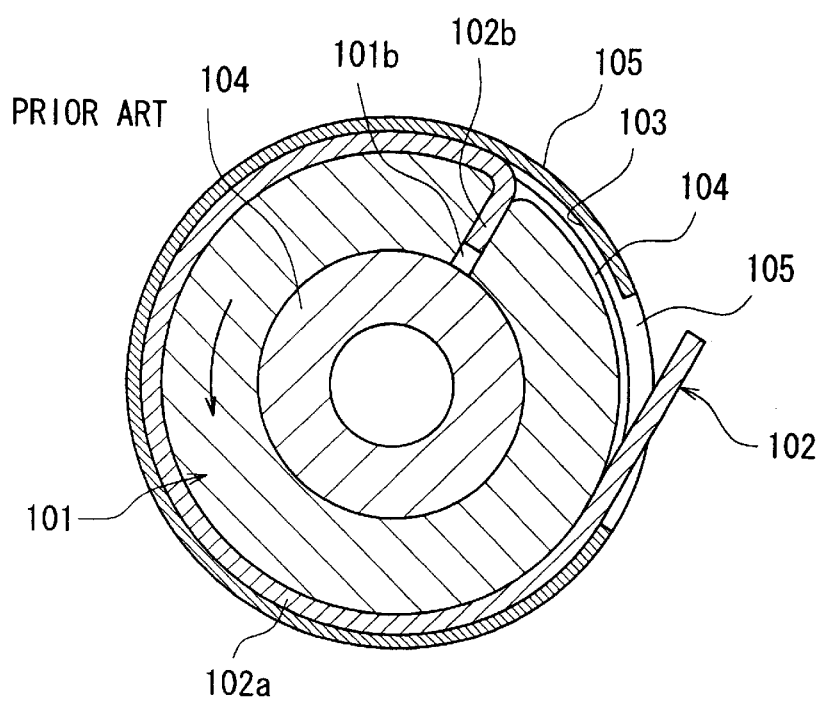
FIG. 12 is a section view of the end cap of prior art, illustrating the state where the end cap is rotated.
Figure 13:
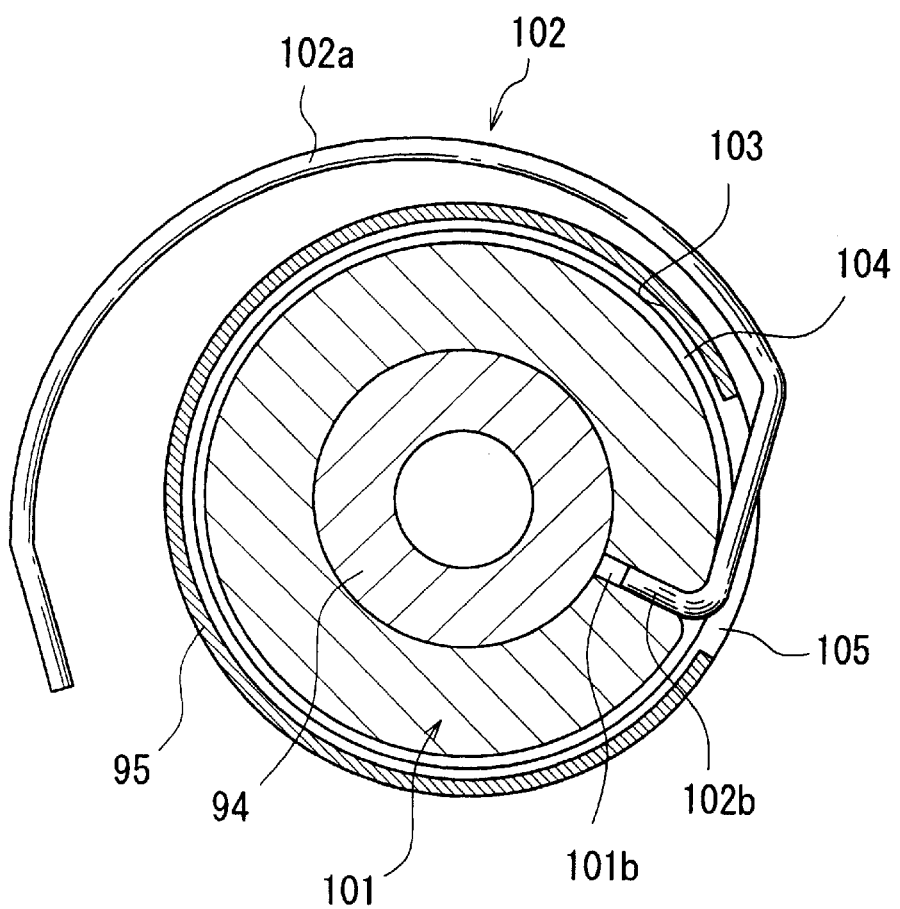
FIG. 13 is a section view of the end cap of prior art, illustrating the state where the end cap is further rotated.
Figure 14:
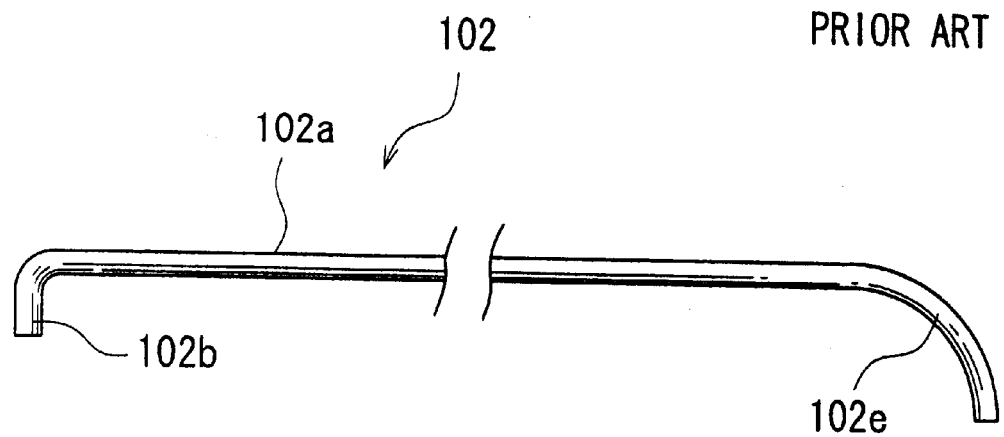
FIG. 14 is a front view of another cir-clip in a free state of prior art.
Figure 15:
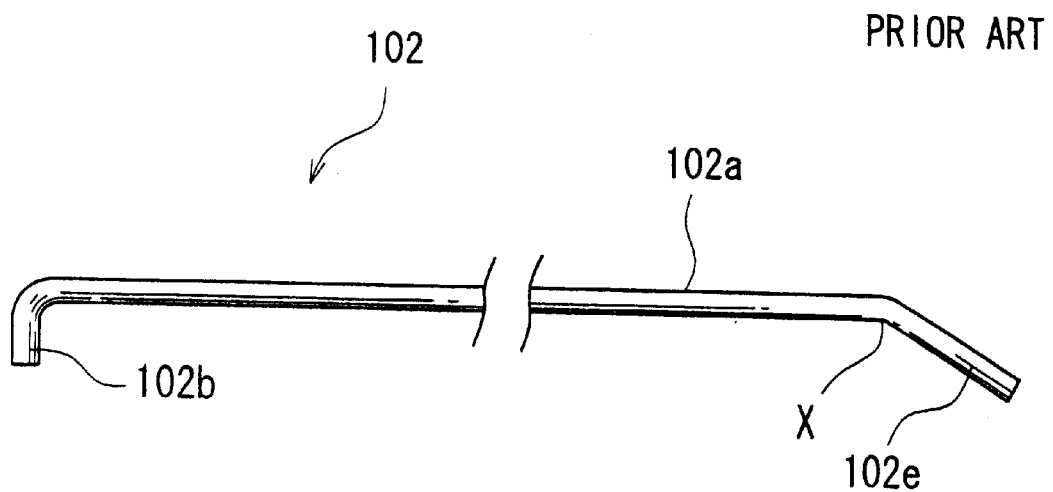
FIG. 15 is a front view of a further cir-clip in a free state of prior art.

A ring-like end cap 11 is interposed between the rack 4 and the cylinder tube 19 at an end of the oil chamber 22, and the rack 4 is slidably inserted inside of the end cap 11. The end cap 11 is provided at the inner and outer peripheries thereof with seals for hermetically sealing the oil chamber 22. The end cap 11 is secured to the cylinder tube 19 by a cir-clip 30. More specifically, likewise in the prior art shown in FIG. 9, annular grooves 13, 14 are oppositely formed respectively in the inner periphery of the cylinder tube 19 and the outer periphery of the end cap 11, each annular groove 13, 14 having a depth substantially equal to a half of the diameter of the cir-clip 30. The cir-clip 30 is inserted into the annular space defined by the annular grooves 13, 14, thus preventing the end cap 11 from moving in the axial direction of the cylinder tube 19 (See FIG. 2).

Figure 2:
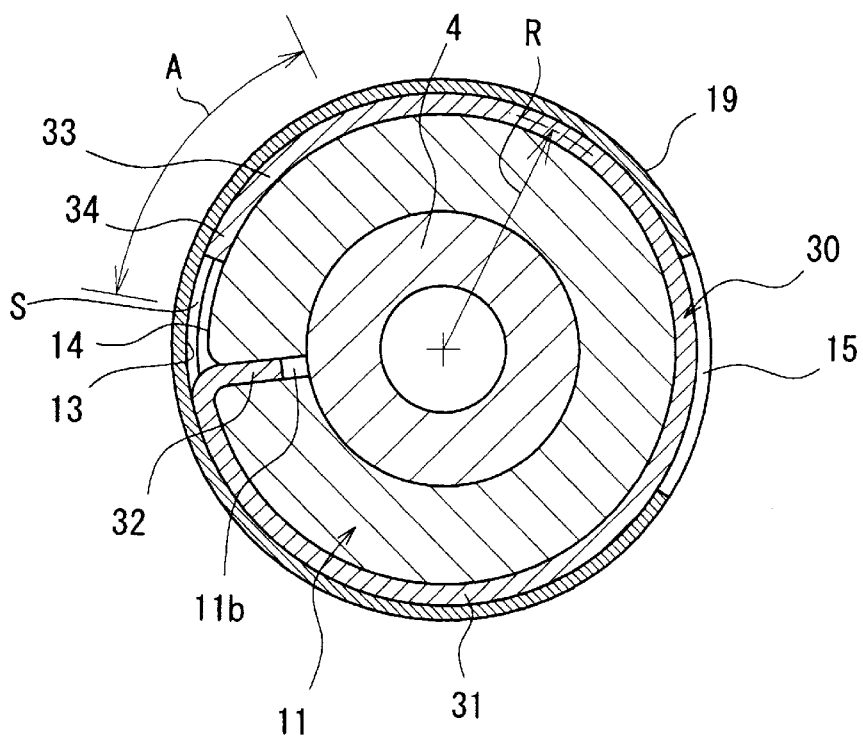
FIG. 2 is an enlarged section view taken along the line II—II in FIG. 1.
Figure 3:
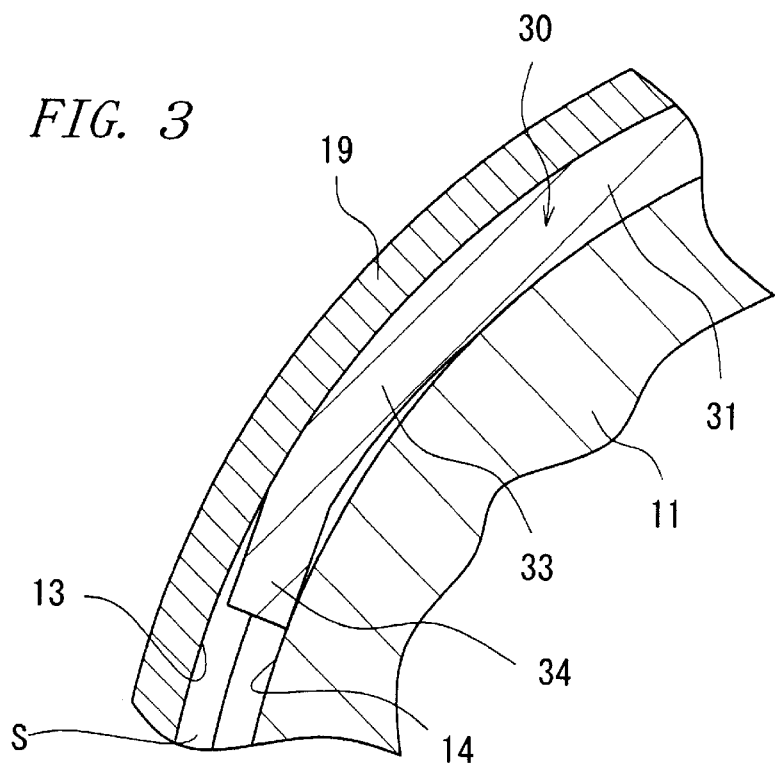
FIG. 3 is an enlarged view of the range shown by an arrow A in FIG. 1.

As shown in FIGS. 2 and 3, the cir-clip 30 has a winding portion 31 following the annular grooves 13, 14, a hook portion 32 bent inwardly from one end of the winding portion 31, a curved portion 33 bent inwardly from the other end of the winding portion 31, and a linear portion 34 linearly extending inwardly from the tip of the curved portion 33. The cir-clip 30 is made of, for example, a metallic wire having a diameter of about 1.8 mm.

Figure 4:
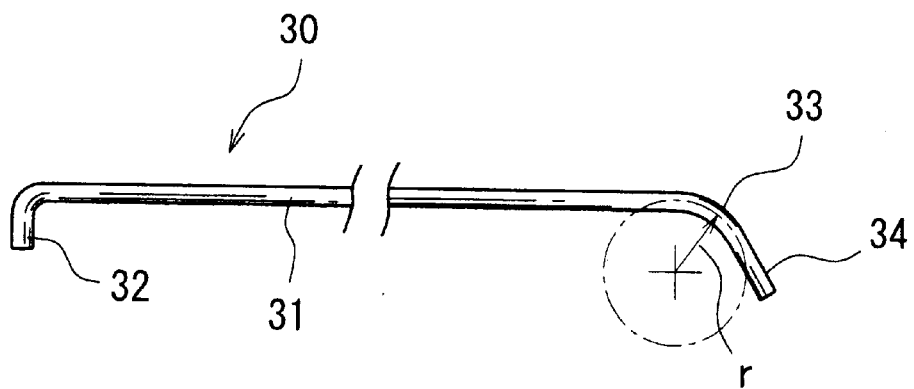
FIG. 4 is a front view of a cir-clip in a free state.

FIG. 4 is a front view of the cir-clip 30 in a free state before mounted in the space between the annular grooves 13, 14. As shown in FIG. 4, the winding portion 31 of the cir-clip 30 extends linearly, and the hook portion 32 is bent at a right angle to the winding portion 31. The curved portion 33 is bent to the same side to which the hook portion 32 is bent, and the linear portion 34 extends to the same side to which the hook portion 32 extends. More specifically, the winding portion 31, the hook portion 32, the curved portion 33 and the linear portion 34 are located on the same plane.

In the free state shown in FIG. 4, the curvature radius r of the centerline of the curved portion 33, is smaller than the curvature radius R of the centerline of the annular space S defined by the annular grooves 13, 14 (See FIG. 2). More specifically, the curvature radius r of the centerline of the curved portion 33 in the free state, is set to 80% of the curvature radius R of the centerline of the annular space S. The length and angle of the tip portion of the linear portion 34 are set such that this tip portion always comes in contact with the bottom of the annular groove 14 of the end cap 11 when the cir-clip 30 is mounted in the space between the annular grooves 13, 14.

The cir-clip 30 having the arrangement above-mentioned, is mounted in the space between the annular grooves 13, 14 with the hook portion 32 hooked on an engagement groove 11b of the end cap 11 and with the hook portion 32 located substantially at the opposite side of an insertion opening 15 with respect to the axis of the end cap 11 (See FIG. 2). At this state, as resiliently deformed to substantially follow the annular grooves 13, 14, the curved portion 33 and the linear portion 34 are held by and between the annular grooves 13, 14 (See FIG. 3). The curvature radius r of the curved portion 33 in the free state, is smaller than the curvature radius R of the annular groove 14 of the end cap 11. Accordingly, the elastic rebound force of the curved portion 33 resulting from the resilient deformation above-mentioned, becomes great. Therefore, the curved portion 33 and its vicinities can strongly resiliently be mounted between the annular grooves 13, 14. This effectively prevents the end cap 11 from being rotated.

Figure 5:
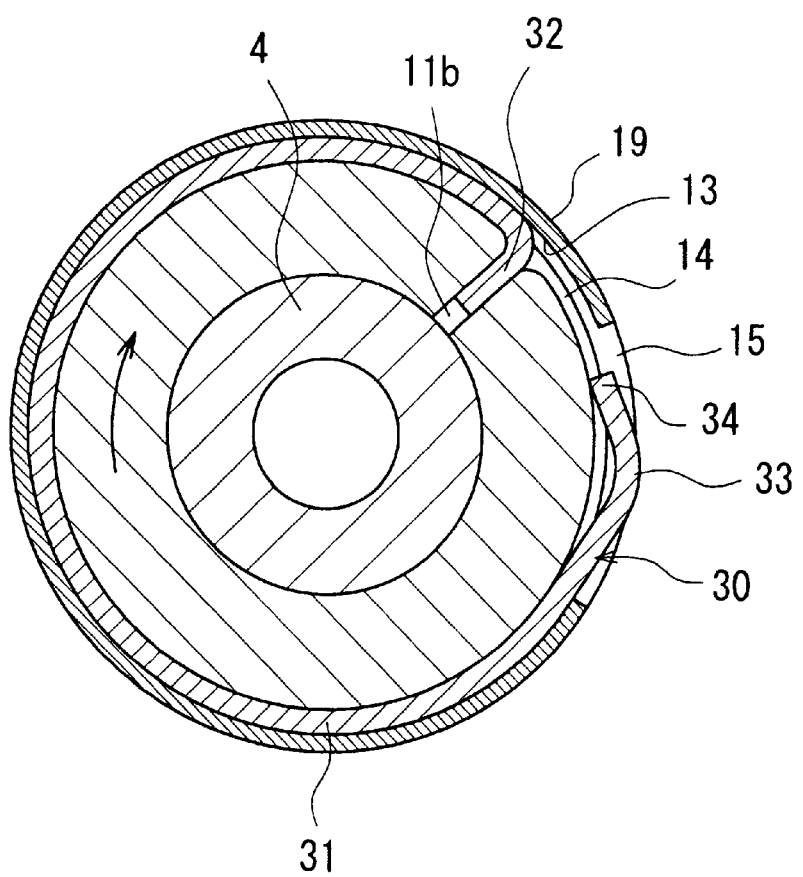
FIG. 5 is a section view of the end cap as rotated in one direction.
Figure 6:
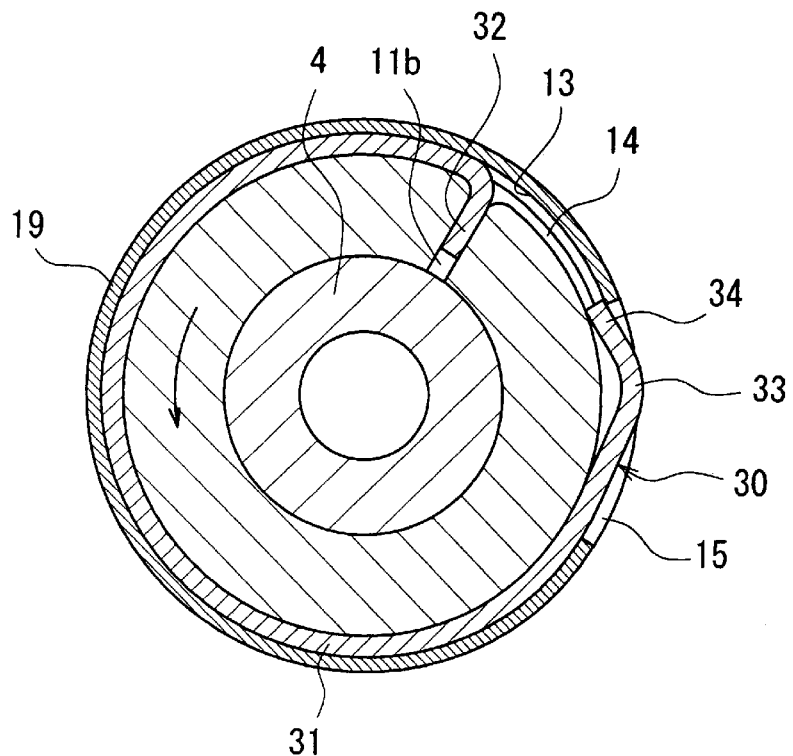
FIG. 6 is a section view of the end cap as rotated in the other direction.
Figure 8:
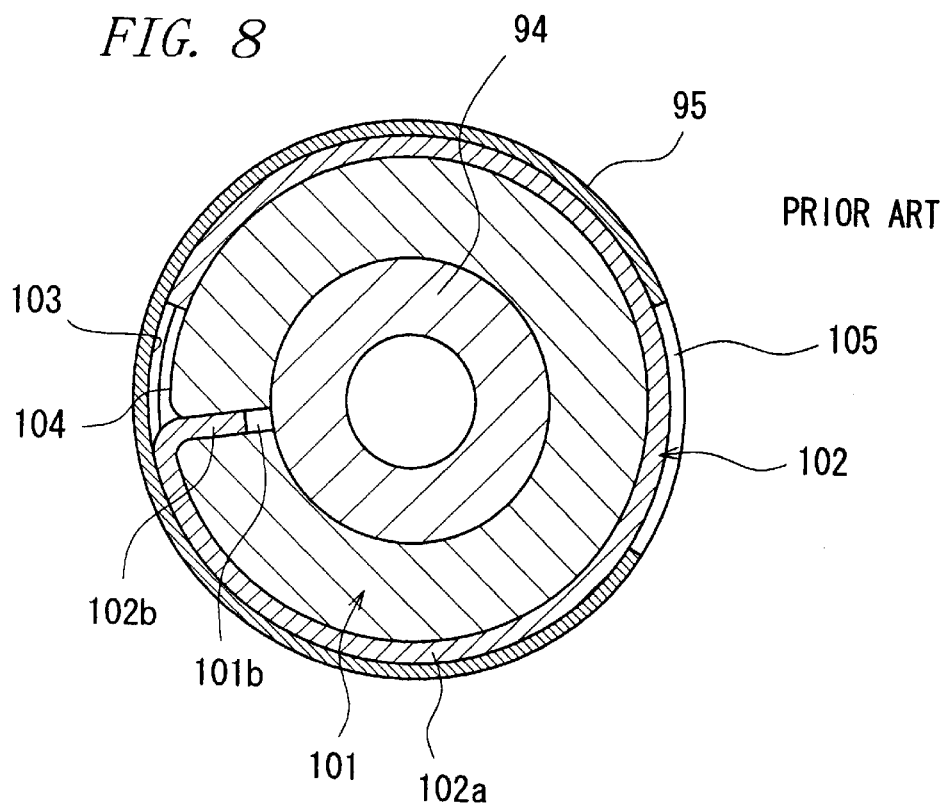
FIG. 8 is an enlarged section view taken along the line VIII—VIII in FIG. 7.
Figure 7:
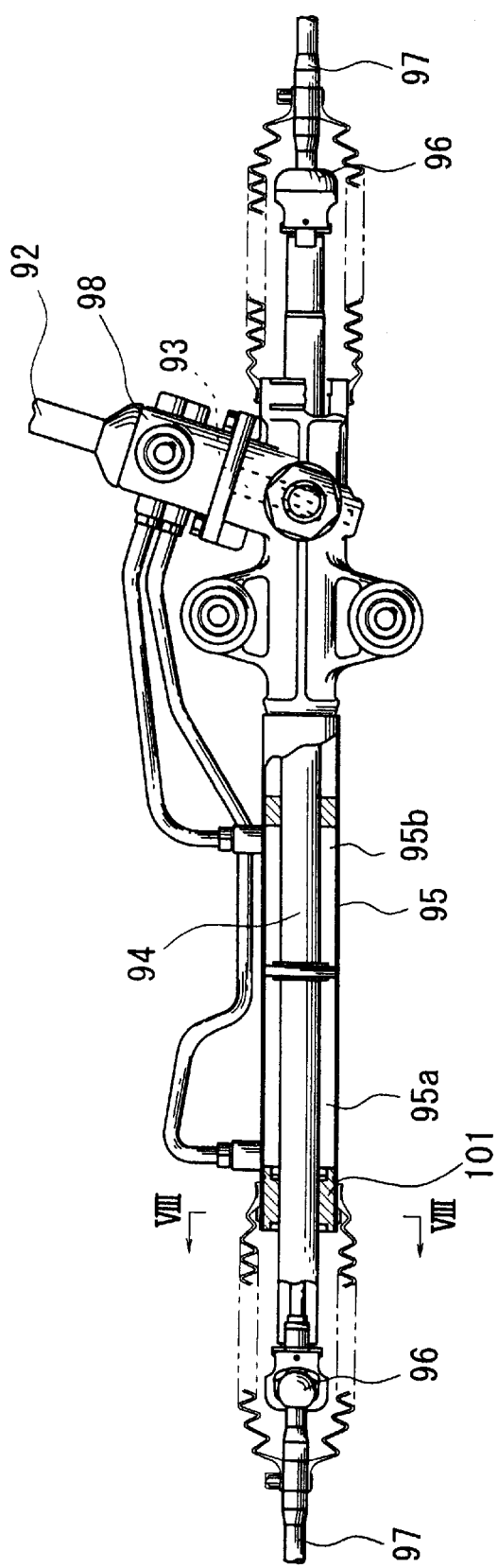
FIG. 7 is a front view, with portions broken away, of a rack-pinion type steering apparatus of prior art.

If the end cap 11 is repeatedly rotated to cause the curved portion 33 and the linear portion 34 to be moved to the insertion opening 15 of the cylinder tube 19, the curved portion 33 and the linear portion 34 are restored substantially to the original shapes, and the curved portion 33 and its vicinities project from the insertion opening 15 (See FIG. 5). At this time, the tip of the linear portion 34 is held as coming in contact with the bottom of the annular groove 14 of the end cap 11. Accordingly, when the end cap 11 tends to be rotated counterclockwise in FIG. 6, the tip side of the linear portion 34 does not run onto the upper edge of the insertion opening 15, but is engaged therewith. On the other hand, when the end cap 11 tends to be rotated clockwise, the curved portion 33 and its vicinities projecting from the insertion opening 15, are engaged with the lower edge of the insertion opening 15 (See FIG. 5). It is therefore possible to securely prevent the end cap 11 from being rotated both clockwise and counterclockwise. This securely prevents the winding portion 31 of the cir-clip 30 from springing out of the cylinder tube 19. Further, the winding portion 31 leads to the linear portion 34 through the curved portion 33. It is therefore possible to prevent stress concentration from occurring at the turning portion. This consequently prevents the cir-clip 30 from being broken.

I claim:

1. A rack-pinion steering apparatus comprising:

a pinion connected to a steering shaft;

a rack meshed with said pinion;

a cylindrical housing in which said rack is inserted;

an end cap inserted into one end of said housing with said rack inserted in said housing; and a cir-clip interposed between a first annular groove formed in an outer periphery of said end cap and a second annular groove which is opposite to said first annular groove and which is formed in said housing, said cir-clip being provided at an end thereof with (i) an inwardly bent curved portion having a tip and (ii) a linear portion linearly extending inwardly from said tip of said curved portion, wherein said tip always engages said first annular groove in said end cap at its bottom, said cir-clip being arranged to prevent said end cap from being moved axially of said housing, wherein said curved portion of said cir-clip in a free state has a curvature radius that is smaller than the curvature radius of said first annular groove of said end cap.

* * * * *